2 Sheets—Sheet 1.

J. P. COLFELT.
Journal-Bearing.

No. 224,391. Patented Feb. 10, 1880.

WITNESSES
INVENTOR
ATTORNEY

2 Sheets—Sheet 2.
J. P. COLFELT.
Journal-Bearing.
No. 224,391.      Patented Feb. 10, 1880.
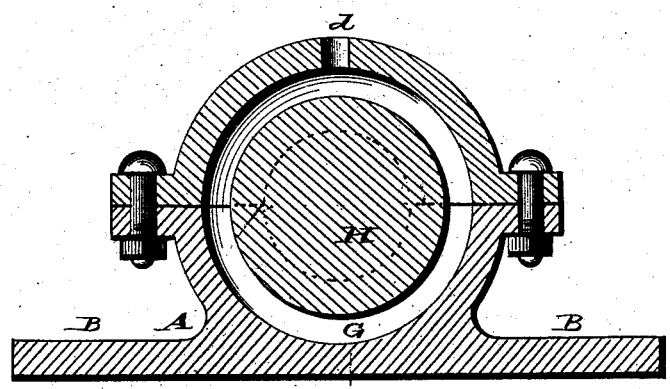
WITNESSES
INVENTOR
ATTORNEY
N. PETERS, PHOTO-LITHOGRAPHER, WASHINGTON, D. C.

UNITED STATES PATENT OFFICE.

JAMES P. COLFELT, OF WINCHESTER, VIRGINIA.

JOURNAL-BEARING.

SPECIFICATION forming part of Letters Patent No. 224,391, dated February 10, 1880.

Application filed December 20, 1879.

*To all whom it may concern:*

Be it known that I, JAMES P. COLFELT, of Winchester, in the county of Frederick and State of Virginia, have invented certain new and useful Improvements in Journal-Bearings; and I do hereby declare the following to be a full, clear, and exact description of the invention, such as will enable others skilled in the art to which it pertains to make and use it, reference being had to the accompanying drawings, which form part of this specification.

My invention relates to an improvement in journal-bearings, the object being to provide a bearing and journal of such construction that a sufficient quantity of lubricating material may be stored in a groove formed in the central portion of the bearing to constitute a regular and constant supply for the journal for quite a considerable length of time, the relative construction and arrangement of the bearing and journal being such that the oil or lubricant will be drawn from the groove or channel outwardly in opposite directions and lubricate the two bearing-surfaces at each end of the journal, and waste of lubricant be prevented by means of flanges formed at opposite ends of the bearings, said flanges fitting against the end shoulders on the enlarged journals or collars on the shaft.

To this end my invention consists in the construction and combination of parts in a journal-bearing, as will hereinafter be described, and set forth in the claim.

Figure 1:
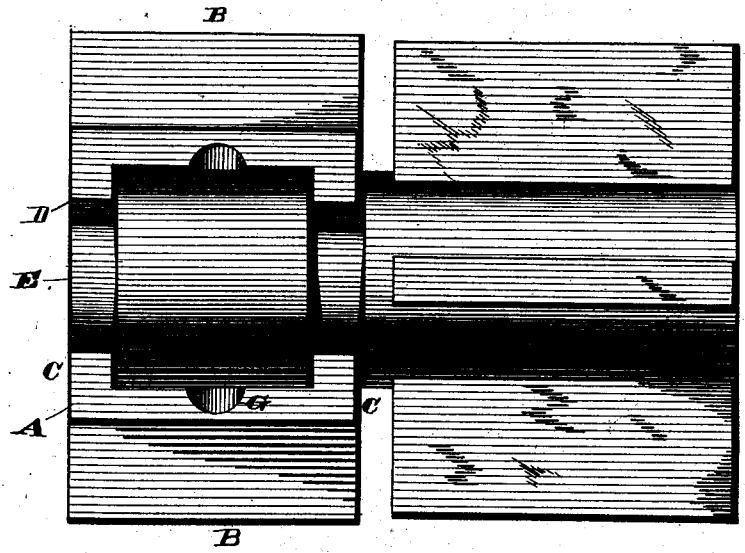
Figure 2:
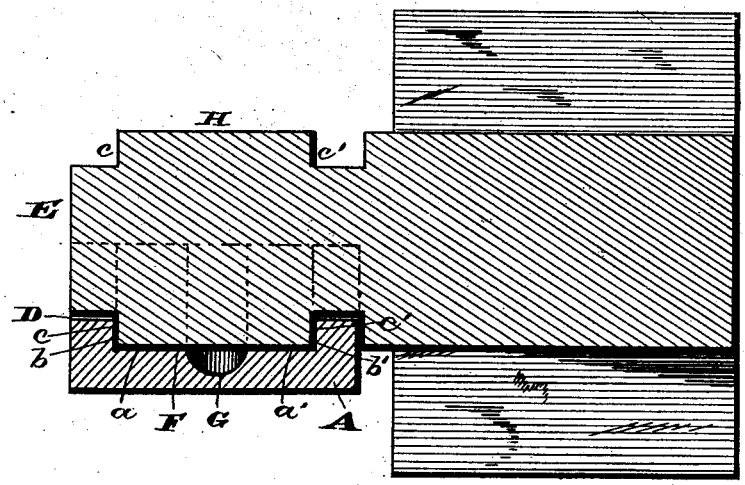

In the accompanying drawings, Figure 1 is a plan view, and Fig. 2 a view in longitudinal section, of my improvement; Fig. 3, a cross-section.

A represents the journal-bearing, having outwardly-projecting flanges B B connected or formed solidly therewith for securing the bearing in place.

At opposite ends of the bearing are formed the end flanges, C C, each having a semicircular opening, D, formed therein for the reception of the shaft E, said openings D being of slightly greater diameter than said shaft to prevent any wear of the latter.

Between the flanges C C is formed the semicircular or concave bearing proper, F, which is subdivided into two wearing-surfaces, $a\ a'$, the latter being separated by an oil groove or chamber, G, while the outer ends of said wearing-surfaces $a\ a'$ are bordered by the inner vertical walls, $b\ b'$, of the flanges C C.

Within the bearing is located the enlarged journal or collar H, formed on the shaft E, said journal being of greater diameter than the shaft, thereby reducing the velocity of the moving and wearing surface of the journal, and thus obviating the danger of unduly heating the lubricant which is often incident to journals of small diameter, especially if a high rate of speed is required. The annular shoulders $c\ c'$, on opposite ends of the journal-bearing H, abut against the vertical walls or bearing-surfaces $b\ b'$ of the journal-bearing.

Oil or other lubricant is inserted into the oil chamber or groove G, and as the enlarged journal H revolves the air is partially exhausted from between the wearing-surfaces of the journal and the wearing-surfaces $a\ a'$, located on opposite sides of and connecting with the oil chamber or groove G, thereby causing the lubricant to be drawn in opposite direction from its central receptacle and lubricate the wearing-surfaces $a\ a'$ and the end bearing-surface, $c\ c'$, of the bearing, and hence supply the enlarged journal-bearing with a constant and regular quantity of lubricating material both on its entire periphery and its annular shoulders. The end flanges on the bearing not only receive any end-thrust of the shaft and support the latter in proper alignment, but also serve to prevent any waste of lubricant.

In some cases I may employ a cover, as represented in Fig. 3, the cover being provided with an oil-inlet, $d$, through which oil is inserted and allowed to flow to the central groove or oil-chamber in the bearing.

I am aware that journal-bearings have been provided with oil-receptacles, and hence I would have it understood that I make no broad claim to such construction; but, Having fully described my invention, what I claim as new, and desire to secure by Letters Patent, is—

The combination, with a shaft having an enlarged journal, H, provided with end bearings or annular shoulders, $cc'$, on opposite ends thereof, of a journal-bearing provided with end flanges, C C, wearing-surfaces $a\ a'$, and central groove or oil-receptacle, G, substantially as and for the purpose shown and described.

In testimony that I claim the foregoing I have hereunto set my hand this 24th day of November, 1879.

JAMES P. COLFELT.

Witnesses:
G. E. BUSHNELL,
L. N. HUCK.